May 4, 1965  R. E. BRACKIN  3,181,528
PROCESS AND APPARATUS FOR ANALYZING JOINT DISORDERS
Filed Feb. 16, 1961  4 Sheets-Sheet 1

INVENTOR.
Roy E. Brackin
BY
Wood, Herron & Evans
ATTORNEYS

May 4, 1965 R. E. BRACKIN 3,181,528
PROCESS AND APPARATUS FOR ANALYZING JOINT DISORDERS
Filed Feb. 16, 1961 4 Sheets-Sheet 2

INVENTOR.
Roy E. Brackin
BY
Wood, Herron & Evans
ATTORNEYS

May 4, 1965   R. E. BRACKIN   3,181,528
PROCESS AND APPARATUS FOR ANALYZING JOINT DISORDERS
Filed Feb. 16, 1961   4 Sheets-Sheet 3
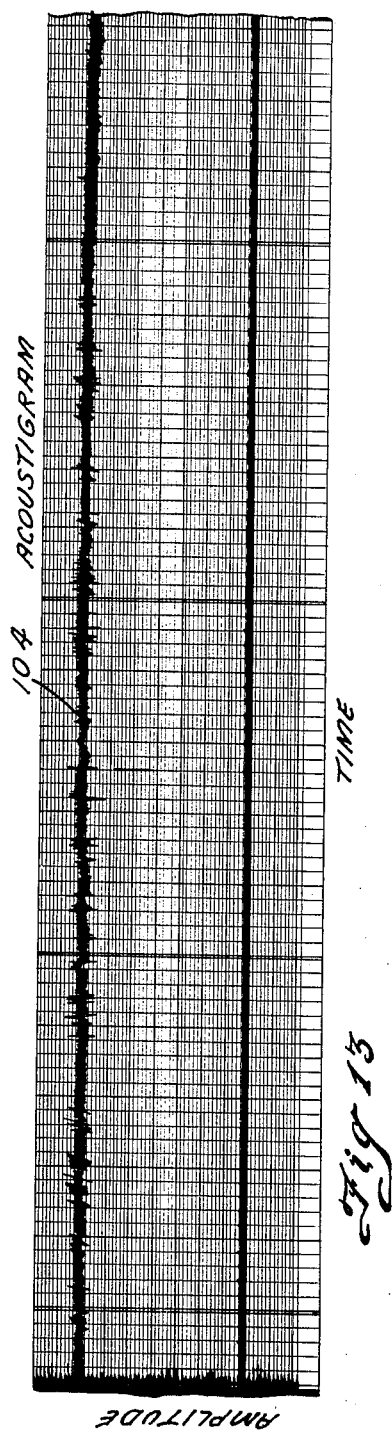
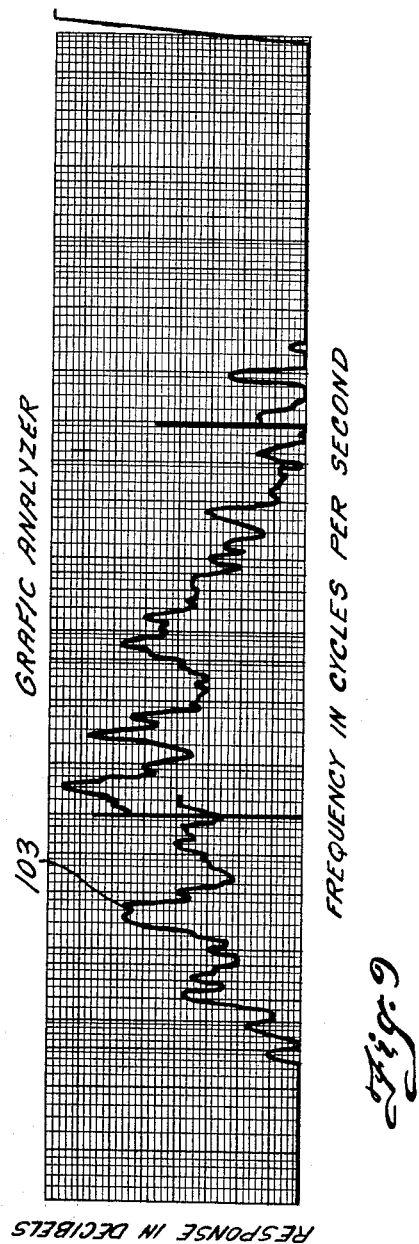
INVENTOR.
Roy E. Brackin
BY Wood, Herron & Evans
ATTORNEYS May 4, 1965  R. E. BRACKIN  3,181,528
PROCESS AND APPARATUS FOR ANALYZING JOINT DISORDERS
Filed Feb. 16, 1961  4 Sheets-Sheet 4
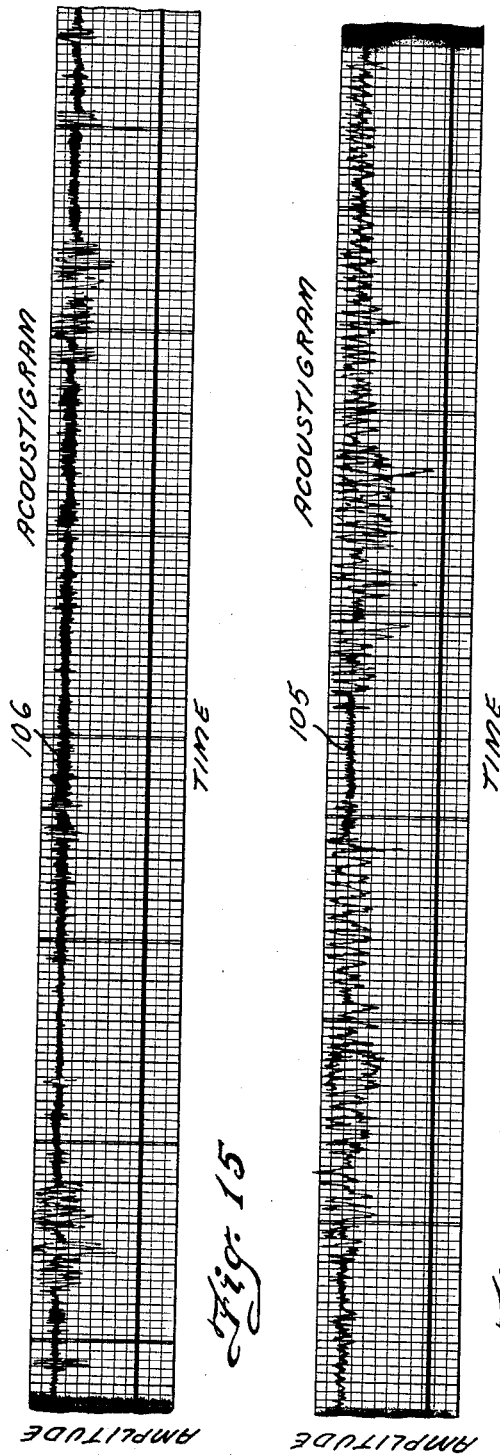
INVENTOR.
Roy E. Brackin
BY
Wood, Herron & Evans
ATTORNEYS United States Patent Office 3,181,528
Patented May 4, 1965

3,181,528
PROCESS AND APPARATUS FOR ANALYZING
JOINT DISORDERS
Roy E. Brackin, 1866 N. Sheridan Road,
Highland Park, Ill.
Filed Feb. 16, 1961, Ser. No. 89,807
3 Claims. (Cl. 128—2)

This invention relates to a process and apparatus for the diagnosis of joint disorders.

The invention will be disclosed with particular relation to the knee joint. However, as will be explained below, the invention has relation to any portion of the body having bones which move relative to one another and/or cartilage interposed between the bones which provides an antifriction bearing surface.

In joints of this type, the present invention is directed to the providing of a diagnostic method and device by which many pathologic states of the joint can be quickly and accurately detected. The present invention permits the detection of joint disorders which are not in fact detectible by X-rays and, additionally, permits the detection of other disorders without resorting to the laborious and time-consuming X-ray technique.

In the 1930's, Steindler performed extensive experiments in the art of detecting joint malfunctions by means of sound detecting equipment. An article describing his activities in detail may be found in The Journal of Bone and Joint Surgery for January—1937. I have been able to go much further than Steindler was able to go in his experiments by providing improved exploratory devices, improved exploratory processes and improved analytical apparatus.

In order to be best able to understand my improved apparatus, the nature of the joint disorders must be clearly understood. As indicated above, reference will be made particularly to the knee joint wherein the disorders are, as a rule, more frequent and more complex than in other joints. A thorough comprehension of the invention as it is applied as a diagnostic device and process with respect to the knee joint will facilitate the comprehension of the invention as it should be applied to other anatomical disorders.

Broadly, the joint may be classified into three areas of concern. The first is the bone, the second is the cartilage and the third is the fluid in the joint. There are two major bone disorders which can be considered. The first is osteoarthritis, or proliferative hypertropic arthritis or degenerative arthritis. This type of arthritis is typified by an overgrowth of bone tissue on the articular surfaces of the joint.

The second is rheumatoid or atrophic arthritis. This type of arthritis is typified by a shrinking of the joint capsule and destruction of the articular cartilage covering the ends of the bones.

Insofar as the knee joint is concerned, the cartilage injuries under consideration are those affecting the semilunar cartilages, that is, the cartilages of which there is one on each side of the knee and within the joint. The injuries to these cartilages vary. The cartilages may become dislocated. In some instances a cartilage develops a tear shaped like a bucket handle. In other instances a cartilage has a complete fracture in which a portion of the cartilage may be torn off and become loose in the joint space.

An articular cartilage injury or disease is known as osteochondritis dessicans. As the name indicates, this is a drying up of the cartilage. This injury or disorder often results in fragments which break off the cartilage and become loose bodies known as joint mice.

The third major area of concern in the joint involves the joint fluid. Disorders include hydro-arthrosis which is excess fluid accumulated in the joint.

Another joint condition involves a reduction in the amount of synovial fluid in the joint. This pathologic state is associated with osteoarthritis. Another condition is hemo arthrosis or blood in the joint. There are many others.

The present methods of diagnosing the pathologic states outlined above include taking the history of the patient, physical examination of the patient and X-rays of the affected areas. There is a diagnostic technique known as pneumoarthography which comprises the injecting of air into the joint space and the taking of X-rays. Additionally, the joint may be aspirated and an analysis of the fluid obtained may assist in the diagnosis of a joint disorder.

The known techniques as outlined above are comparatively incomplete and are certainly laborious tools for prompt and accurate diagnosis. The proper practice of the present invention results in providing almost all the information presently obtainable with the known techniques described above and additionally provides information with respect to semilunar cartilage injuries which are almost impossible to detect by the known methods excepting when the knee is locked. Furthermore, the present invention provides the best method known for the diagnosis of minimal changes in an arthritic pathologic state before the disease has progressed to the relatively advanced stage when changes are detectible by the X-ray.

An objective of the present invention is to provide acoustical diagnostic apparatus which includes improved devices for listening to the sounds of pathologic joints, the listening devices being designed to localize the particular area of the joint being examined, listened to and in question. Therefore definite spot localization is possible.

Another objective of the invention is to provide analytical apparatus which will determine, on the basis of the quality and quantity of the produced sound, the nature of the pathologic state.

Still a further objective of the invention is to provide comparative apparatus by which identical joint areas of the same or similar human beings can be compared so that distinct acoustical deviations from normal can readily be detected which corroborate and substantiate the clinical impression and provide a control on treatment effects.

These and other objectives of the invention will become more readily understood from the following detailed description taken in conjunction with the accompanying drawings in which:

FIG. 9 is a representative analyzer graph;

FIGS. 13, 14 and 15 are illustrations of actual acoustical records.

Figure 1:
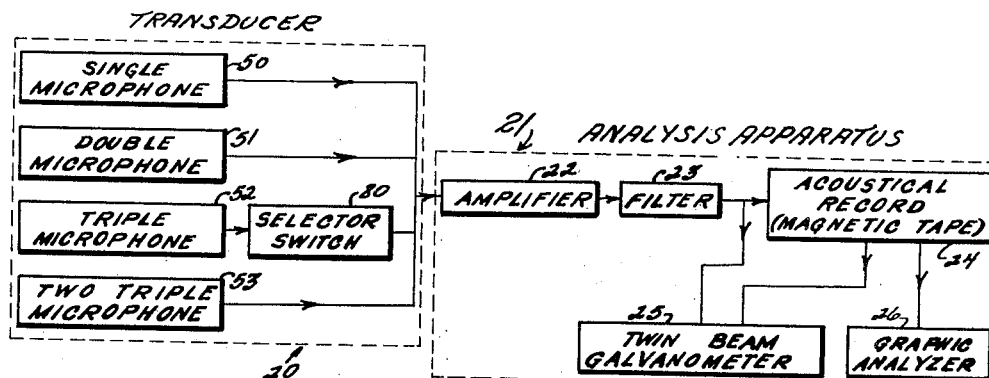
FIG. 1 is a block diagram of the analytical apparatus.

As shown in FIG. 1, the apparatus fundamentally comprises a transducer 20 and analysis apparatus 21. The function of the transducer 20 is to convert acoustical energy originating from the joint into electrical enrgy which is to be analyzed. The function of the analytical apparatus is to translate the electrical energy from the transducer from the transducer into intelligible media from which a diagnosis may be made.

To facilitate comprehension of the invention, the apparatus and methods to be described, a brief description of the invention as it is employed in developing an electrical signal from a joint will be helpful. Because of the prevalence of injuries to the knee, and particularly to the semilunar cartilages, and also because of the prevalence of arthritis in the knee, it being the largest joint in the body, the invention will be described with particular reference to the knee joint. It should be understood that similar techniques may be applied to other joints, large or small, superficial or deep in relation to surface of the body.

In employing the apparatus of FIG. 1, the acoustical energy is generated through the movement of the joint elements or structures with respect to one another. Preferably the apparatus should be employed after the patient has rested through the night to eliminate the effects of suface weight-bearing and dispersion of synovial fluid.

The patient is placed in a supine position with the thigh raised to a vertical position, thus gravity closes the joint space bringing defective surfaces together for sound effect. In this position, the patient undergoes one or more active extensions and passive extensions. In the active extension, the patient voluntarily, and without assistance, extends his leg vertically and then returns it to a position against the thigh with the thigh remaining in as vertical a position as is possible to obtain. The passive extension requires an attendant to lift the foot until the leg is completely extended and then to lower the foot until the calf again rests against the vertical thigh.

During active and passive extensions, one or more transducers 20, such as a crystal or magnetic microphone, are held in a preselected position on the joint to be analyzed. Electrical signals generated by the transducers will be received by the apparatus 21 and certain records made from which the pathologic state can be diagnosed.

It might be possible to bring out the acoustical signals with greater intensity by having the patient squatting from a standing to a sitting and back to a standing position. However, the supine position, with the thigh vertical, is preferred not only for convenience but also the weight of the lower leg closes the joint space and thus brings all elements in close contact. Upon movement, rough abnormal changes and defects produce distinctive sounds. Further, many patients find it quite difficult to assume a squatting position while an attendant applies a microphone. Additionally, some injuries prevent any substantial weight being applied to the joint. For best clinical results, if substantially all tests are run when the patients are in substantially the same position, the more effective comparison can be obtained.

In many circumstances, the passive motion will provide substantially identical results to the active motion. The passive motion has a number of advantages. The passive motion is under the control of the attendant and can be a complete extension. Under active motion, which is limited to the voluntary action of the patient, pain and other factors may prevent the patient from giving a complete extension to the joint. It has been noted that on passive motion a surf-like sound is heard over the postero medial surface. This is believed to be due to the movement of the synovial fluid. The surf-like sound is not heard well with the active motion.

*The apparatus generally*

As indicated above, the apparatus as shown in FIG. 1 comprises a transducer 20 and analysis apparatus 21. Several types of transducers are identified diagrammatically in FIG. 1 and will be discussed and illustrated in more detail below. In the most fundamental aspect of the invention a single microphone is placed in a preselected position on the joint to be analyzed. The electrical signal generated by the microphone is then transmitted to the analysis apparatus 21.

Preferably all electrical signals should pass through an amplifier indicated at 22. Prior to or following the amplifier the signal may be passed through a filter 23 to filter out undesirable sounds. For example, sounds of quite low frequencies, that is, below 60 cycles per second are not related to pathologic problems. The filter may eliminate or so attenuate these frequencies that they will not effect the ultimate analysis. Further, the characteristic semilunar cartilage pop or cartilage click which will be discussed below is believed to generate a signal which is between 70 and 1,000 cycles per second. Because much of the knee joint analysis is concerned with semilunar cartilage injuries, frequencies above 1,000 cycles per second may also be eliminated or attenuated so that they will not be involved in the analysis.

The output of the amplifier and filter combination may be applied to an acoustical recorder 24 such as a magnetic tape recorder. Alternatively, the output from the amplifier and filter combination may be directly applied to the twin beam galvanometer.

Following the application of the apparatus to the patient and the making of an acoustical record, the acoustical record is applied to a graphic analyzer 26.

In the acoustical recorder, a reproducible acoustical record is made so that the physician or diagnostician can hear the record over and over to listen to unusual sounds which may be indicative of a pathologic disorder. In the twin beam galvanometer, one or more records of amplitude versus time of the signal are made. In a broad sense, these records are similar to an electrocardiograph record and are used for visual analysis.

The graphic analyzer is a device which prepares a graph of the amplitudes of all of the frequencies involved in a particular sound. For example, the cartilage click, which is of only a fraction of a second's duration, is made up of a large number of frequencies of varying amplitude. In the graph prepared by a graphic analyzer, the several frequencies and their amplitudes will be indicated.

*The timer*

The value or usefulness of the invention as a diagnostic device will be dependent in part upon the ease and accuracy with which the acoustic and graphic records can be analyzed and interpreted. Many patients and many pathologic states must be examined and recorded until recognizable patterns and acoustic records are developed. In this respect, uniformity of conditions under which the invention is applied will be important so as to facilitate the comparison.

One area in which standardization of the application of the invention can be had is in the length of time for the active and passive extension of the joint.

Standardization can be attained by the application to the body of the patient of a device which would indicate on a record the angular position of the joint elements with respect to each other as they are undergoing flexion. However, it is psychologically difficult to have patients put their limbs in such device. Further, if the device fixed, the speed of flexion, the physical restraining influence of the device on the flexion could well have a deleterious effect on the record and its interpretation. On the other hand, if the device enabled the patient to move his limb freely, the device would lack the standardization of speed of flexion which is believed to be desirable.

Figure 7:
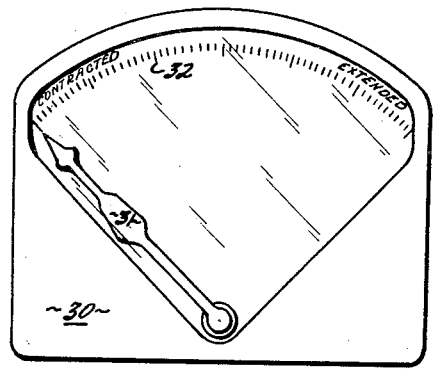
FIG. 7 is a front elevational view of a timer.

The present invention preferably contemplates the use of a device of the type shown in FIG. 7. The device of FIG. 7 is simply a timer designated by the numeral 30, the timer having a pointer 31 which passes along a scale 32. A mechanical or electrical motor causes the pointer to oscillate between the left side designated as "contracted" and the right side designated as "extended." The time interval between contraction and full extension may be approximately four seconds, for example.

In use, a patient, or the attendant in the case of passive extension, will observe the timer and flex the joint in synchronism with the movement of the pointer. One or two practice flexions prior to the actual running of the test will enable the patient to coordinate almost exactly with the movement of the pointer.

Acoustical recorder

As indicated above, the acoustical recorder preferably is a magnetic tape recorder of known design. The particular details of the magnetic recorder need not be described here because of the fact that magnetic recorders are so well known. Certain aspects of the magnetic recorder, however, should be noted.

It is most important for the magnetic recorder to be a very high fidelity instrument with an excellent frequency response over a range from 50 to 25,000 cycles. A magnetic tape recorder, additionally is particularly desirable because of the ability to cut out small sections of the magnetic tape to be applied to a graphic analyzer.

Tape recorders ordinarily have amplifiers as a normal part of the tape recorder circuitry. The amplifier of the tape recorder will satisfy the requirements of the amplifier 22 shown in FIG. 1. When the amplifier of the tape recorder is employed in the apparatus of the invention, the filter 23 will normally be placed in the circuit ahead of the tape recorder amplifier.

Twin beam galvanometer

The twin beam galvanometer is apparatus which is known and has been used in analysis, for example in cardiography. However, the apparatus is employed in the invention to provide a comparison between normal and pathologic states of joints under consideration.

Broadly, the twin beam galvanometer is a device having a movement dependent upon the intensity and frequency of the signal received. The movement of a signal sensing device swings a light beam on a photosensitive paper which moves preferably at 75 mm. per second but can be set to move at 2.5 or 25 mm. per second. When the tape is developed, the tape presents a tracing indicative of the frequency and intensity of the signal received.

Figure 8:
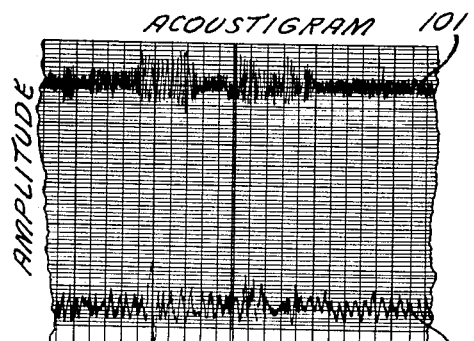
FIG. 8 is a representative acoustigram produced by the twin beam galvanometer.

The instrument is adapted to receive two input signals simultaneously and to make two separate tracings 101 and 102 spaced apart from each other as shown in FIG. 8. There are occasions when the instrument would be used with only one input to the galvanometer so that only one tracing would be made. In such event, a single microphone would be applied to one area of the joint and a tracing made. Such a tracing might immediately tell the operator the nature of the pathologic state of the knee. For example, arthritic joints will provide a distinctive tracing because of the noise generated by the rubbing of the condyles (see FIG. 14). A "joint mouse" will likewise provide a distinctive pattern (see FIG. 15).

The dual tracing has been found to be one of the most useful applications of the instrument. In making the dual tracing, identical microphones are similarly positioned on two separate joints of the same general type. For example, one microphone might be placed over the medial semilunar cartilage of the left knee and the other microphone placed over the medial semilunar cartilage of the right knee. Records of passive and active extensions of both joints with the legs moving simultaneously in unison are made. Assuming that one joint is functioning normally, while the other joint has a pathologic disorder to be diagnosed, a comparison of the two tracings noting the deviation from normal could be made.

If circumstances seem to preclude the use of a patient's own joint to provide the "normal" tracing the joint of another person as similar as possible in age, stature and the like could be used to make the "normal" tracing to provide the comparative pattern.

The twin beam galvanometer thus provides a useful tool in making a diagnosis. Experience and comparison with normal joint sounds will show the diagnostician where substantial deviations from normal have occurred, and, from the comparison to the normal, deviations can be identified with respect to the pathologic state.

In presently available twin beam galvanometers, the photosensitive recording paper is housed in a light tight chamber and, after a record is made, the chamber holding that portion of the paper on which the record was made is removed and processed with usual dark room equipment.

Figure 10:
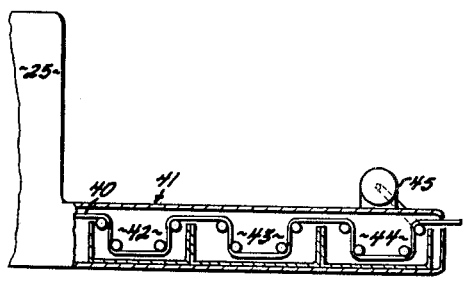
FIG. 10 is a diagrammatic view showing an improvement in a twin beam galvanometer in which the records are produced substantially simultaneously with the analysis.

I propose to improve the usefulness of the twin beam galvanometer by adding to it a developing system such as is shown in FIG. 10. A fragment of the twin beam galvanometer 25 is also shown in this figure. The light sensitive paper is shown at 40, and developing chamber 41 is mounted on the galvanometer adjacent the chamber containing the light sensitive paper. Within the chamber 41 is a developing tank 42, a rinsing tank 43 and a fixing tank 44. Drive means 45 is diagrammatically indicated at the exit end of the chamber 41, the mechanism 45 drawing the paper through the developing chamber 41.

In the operation of the invention, after the record has been made, instead of removing the light sensitive paper for further processing, the paper can be drawn through the developing chamber 41 so that a completed fully developed record will be available within minutes following the making of the record.

Graphic analyzer

The graphic analyzer is a sophisticated instrument which may be employed to pinpoint the nature of the pathologic state under diagnosis. The graphic analyzer separates a particular signal into all of its component frequencies and their amplitudes. For example, in all knee joints, the cartilage tends to click or pop under either active or passive extension. This cartilage pop is much less than one second in duration. If this particular sound is presented to the graphic analyzer, an analysis of the sound can be prepared such as is indicated by the curve 103 in FIG. 9.

Now if the cartilage click of a normal cartilage is analyzed and compared to the cartilage click of a cartilage which has been indicated to be abnormal by the twin beam galvanometer record, called the acoustigram, certain characteristic deviations in frequencies and amplitudes can be observed. An accumulation of many such graphic analyses will enable the trained observer to make an accurate diagnosis of the particular malady which has caused the distinctive cartilage click.

Transducers generally

As shown in FIG. 1, several different types of transducers are contemplated. These include the single microphone 50, the double microphone 51, the triple microphone 52 and two triple microphones designated at 53. The microphones may be crystal or magnetic type. The microphones may be provided with filtering systems so as to make the microphones selective to a particular band of frequencies while attenuating those frequencies which should be eliminated.

Single microphone needle-type transducer

Figure 3:
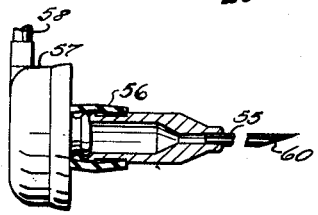
FIG. 3 is a cross sectional view showing the attachment of the needle to the transducer.
Figure 2:
FIG. 2 is a perspective view of a needle type transducer recommended in some cases for the best results.

The needle type transducer is illustrated in FIG. 3 and is shown applied to a knee in FIG. 2. The transducer comprises a needle 55 having an adapter 56 at one end thereof and a microphone 57 attached to the needle by means of the adapter 56 in the form of a flexible resilient rubber tube. Leads 58 are provided to connect the transducer to the tape recorder or alternatively to the twin beam galvanometer.

The needle 55 has a sharp point and preferably is hollow and has a beveled end 60 such as is found in a hypodermic needle. It has been found that the hollow needle provides a path, as well as its solid structure, for an acoustical signal emanating from the knee joint to pass to the transducer 57. The transducer is in its most sensitive position when the beveled face of the needle is directed toward the area of the joint under study.

The advantage of the needle type transducer resides in its selectivity in receiving the sounds from a localized small area of the joint under study. A microphone which is positioned against the skin overlying the knee will receive joint noise from a much larger area than will the needle which has been embedded in subcutaneous tissue closely adjacent the knee joint itself.

FIG. 2 also shows two positions of the leg. The full line position is the contracted position whereas the broken line position is the extended position. In making a record of the joint noise, the leg moves from the contracted position to the extended position and thereafter returns to the contracted position. As indicated above, the leg will move through the two positions during an active extension, that is, when the leg is under control of the patient; and through a passive extension, that is, when the leg is under control of an attendant.

*The double microphone or comparative transducer*

Figure 4:
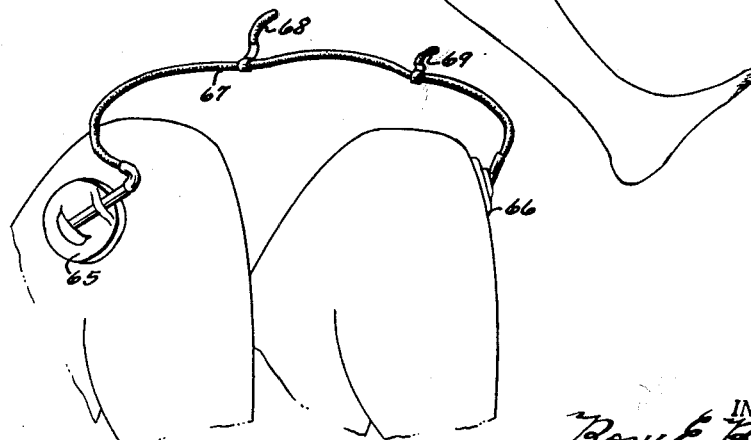
FIG. 4 is a perspective view of a double microphone transducer system.
Figure 5:
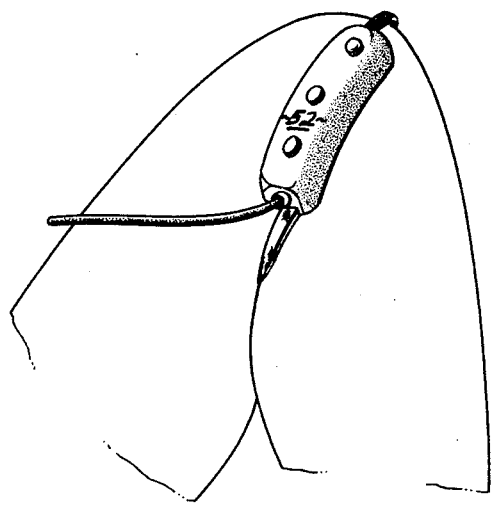
FIG. 5 is a perspective view of a triple microphone transducer.

The double microphone transducer is illustrated in FIG. 4. The transducer comprises a first microphone 65 and a second microphone 66. The microphones are placed opposite the lateral semilunar cartilages of the right and left knees respectively and are held in position by a resilient brace 67. Leads 68 and 69 are provided to connect the microphones to the recording apparatus.

The resilient brace tends to compress the microphones against the knees to hold them in position. It should be understood that the particular brace illustrated could be eliminated and the microphones strapped to the knees in a manner to be described below in connection with the triple microphone transducer.

The double microphone system is especially adapted for use with the twin beam galvanometer. In this combination one microphone 65 is connected to one input of the galvanometer and the other microphone 66 is connected to the other input of the galvanometer so that the two tracings made on the twin beam galvanometer photosensitive paper are an indication of the frequency and amplitude of the joint noise emanating from the cartilage area of the two respective knee joints. In most instances, one of the knee joints is presumed to be functioning normally and its normal tracing may be compared to the knee joint having the pathologic disorder which is to be diagnosed.

While the microphones have been shown positioned against the lateral semilunar cartilages of the knees of one patient, it should also be understood that they may be positioned on other portions of the knee of the same or different person or they may be positioned on opposite sides of one knee, it may be possible, through a comparison of the tracings from the twin beam galvanometer, to determine which side of the knee has produced the pathologic disorder.

*The triple microphone transducer*

The triple microphone transducer is illustrated in FIGS. 5, 6, 11 and 12 and has been diagrammatically identified in FIG. 1. The device comprises three microphones 75, 76 and 77 embedded in a soft resilient material such as the sponge rubber 78. Each microphone has leads 79 which connect the microphones to selector switch 80 shown in FIG. 1. The function of switch 80 is to permit a selection of the particular microphone, the signal of which is to be recorded in the recording and analyzing apparatus.

The microphones are spaced with respect to each other so that when strapped on the leg of a patient, the microphones 75, 76 and 77 may be adjacent the anterior horn, middle (body) and posterior horn of the particular semilunar cartilage over which they are placed. In practice these microphones are selectively activated and the signals generated are selectively recorded thereby providing the signals from the three cartilage areas, the records being made under substantially identical conditions. The sounds which are heard and recorded depend somewhat on the amount of pressure by which the microphones are applied to the skin and other soft tissues overlying the knee joint. For example, if a microphone is applied with very gentle pressure, the low rumble of the femoral condyle roll is attenuated. The graphic record of the signals generated by the cartilages is referred to as an acoustigram menisci or acoustigram of the semilunar cartilages.

Figure 6:
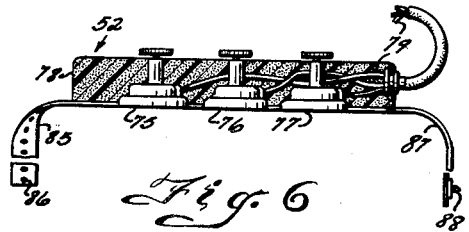
FIG. 6 is a cross sectional view of a triple microphone transducer.
Figure 11:
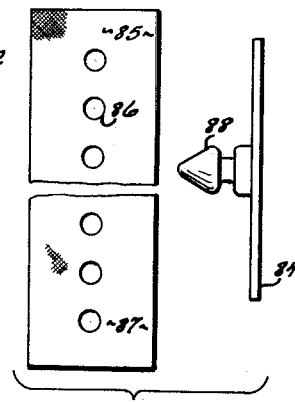
FIG. 11 is an elevational view of a strap for securing a transducer to a knee.

When firmer pressure is applied a much more complete record of the complex joint noises is obtained. It is therefore desirable to provide some means by which the pressure of the microphone on the knee joint may be varied. As shown in FIG. 6, a strap 85 having a number of spaced holes 86 is fixed to one side of the transducer and a strap 87 having a fastener button 88 is fixed to the other side of the transducer. By the proper selection of the hole into which the button 88 is positioned, the pressure of the microphones against the knee joint can be fixed. It can be appreciated that the pressure will be varied if the buttton 88 is shifted from one hole 86 to another. Alternatively, as shown in FIG. 11, both of the straps 85 and 87 might be provided with holes adapted to receive a separate button 88 mounted on a plate 84, the plate being adapted to rest against the knee on the side opposite to that of the microphone.

Figure 12:
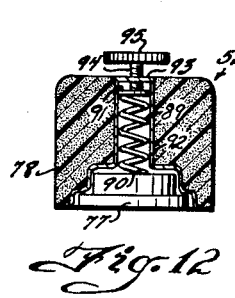
FIG. 12 is a cross sectional view of an improved transducer mount.

The pressure of the microphone on the knee joint can also be varied by the device of FIG. 12. In FIG. 12, a microphone 77, for example, is mounted in the resilient material 78 and is urged outwardly by a spring 89 which is fixed at its end 90 to the microphone. The other end of the spring is fixed to a disc 91 which is slidable in a cylinder 92. The cylinder 92 is closed at its upper end as at 93 except for an opening which is screw threaded to receive a screw 94. The screw 94 is actuated by a knurled head 95. By rotating the knurled head, the spring may be compressed or relaxed and the pressure of the spring on the transducer 77 as it is applied to a knee joint may be varied.

While the pressure varying means described have been applied particularly in connection with the triple microphone system, it should be well understood that the means could be employed equally well with the single or double microphone system.

*Operation*

The manner in which the invention is to be employed in diagnosing a pathologic disorder is subject to wide variation. A few typical examples will be set forth here, it being understood that the examples are illustrative only.

In the first instance, if a patient complains of pain or there are other symptoms which indicate the possibility of a pathologic disorder in the knee, the skilled diagnostician might simply apply a transducer to differing portions of the knee and listen to the sound as received in a magnetic recorder or directly through an amplifier. This preliminary analysis may in and of itself suggest to the diagnostician the disorder from which the patient suffers. Alternatively, the preliminary examination may suggest a particular area to be examined with particular care.

A next step might be to apply the double microphone system as shown in FIG. 2 to similar areas of the left and right knee respectively. Acoustigrams made on the twin beam galvanometer, such as are shown in FIG. 8, will show the manner in which the noise from the abnormal knee deviates from the noise emanating from the normal knee.

If a cartilage injury is indicated, the triple microphone may be applied over the semilunar cartilage affected and records from the sounds of the anterior horn, middle (body) and posterior horn of the semilunar cartilage made. Alternatively, two triple microphones may be applied to the knees as in the double microphone system of FIG. 3 and comparative tracings made of the respective anterior horn, middle (body) and posterior horn of the semilunar cartilages may be produced.

From the records obtained through the use of the invention thus far described it is usually possible to complete the diagnosis. However, because the twin beam galvanometer is at present sensitive only to a limited range of frequencies, the acoustigrams sometimes may not provide a complete picture of the pathologic disorder for diagnostic purposes. In such event it may be necessary to cut from the magnetic tape record of the joint noise the particular segment of noise which is indicative of the pathologic state. If this segment of noise is run through the graphic analyzer, a tracing such as is shown in FIG. 9 should provide a complete diagnosis.

Of course a single acoustigram or graphic analyzer record examined in a vacuum will tell nothing. It will be necessary for the diagnostician to have examined hundreds of knees and kept the acoustigrams and graphic analyzer records of those knees with an indication of a pathologic state shown by the records. With such a background of pathologic patterns, the equipment will enable the making of graphic diagnoses of pathologic states.

Further, by way of example, three acoustigram records showing differing pathologic states are shown in FIGS. 13, 14 and 15. In FIG. 13 is shown an acoustigram tracing 104 of a normal knee made by magnetic transducer positioned over the posterior horn of the medial meniscus, meaning semilunar cartilage.

In FIG. 14 is shown a tracing 105 forming an acoustigram record of a knee diagnosed to have osteoarthritis. This record was made from a magnetic transducer positioned over the mid portion of the internal meniscus. Note the presence of the high amplitude lines in the area where the normal low amplitude sound of the femur and tibia occur. The analysis indicated by the acoustigram proved correct by X-rays of the joint.

FIG. 15 is an acoustigram tracing 106 of a knee found to have a joint mouse. This record was made by a magnetic transducer positioned over the mid portion of the medial semilunar cartilage. Note the high amplitude lines adjacent the normal cartilage click. The presence of these lines led to the diagnosis of a joint mouse which the subsequent X-rays of the patient proved correct.

The acoustigrams and the analyzer graph illustrated herein are exemplary of the type of record obtainable from the proper use of the apparatus of the present invention. Through the use of the needle transducer or the triple microphone transducer specific small local areas of a joint can be examined and records produced which will facilitate the analysis. The use of the double microphone comparator, in which the needle transducer or the triple microphone transducer can be employed, provides side by side records of normal joint noise and noise emanating from a pathologic knee. The side by side comparison of normal to pathologic joints facilitates the rapid diagnosis of a pathologic state. Because of the sensitivity of the equipment and its applicability to small localized areas, a joint disorder as yet undetectable through known X-ray procedures can be diagnosed in its incipient stage.

It might not always be necessary to employ every element of and every technique permitted by the apparatus in making a diagnosis. The apparatus does, however, permit the making of a broad initial survey of a pathologic state and, in successive stages, the malady can be isolated. The broadest survey can be made by simply listening directly to the joint noise or repeating a tape recording of the joint noise. The successive stages of narrowing the field of possibilities include the use of microphone or microphone systems which permit the study of local areas with the final stage of minute examination being the use of the graphic analyzer. The utilization of a timer coupled with the standardization of the joint extension technique results in a series of standardized records which provides a store of background knowledge of pathologic states which can be drawn on in the diagnosis of the disorder.

The submitting of a small clip of magnetic tape on which a particular joint noise has been recorded such as an unusual cartilage click to a graphic analyzer through which the component frequencies and their amplitudes can be segregated and graphically presented provides a useful tool and technique for minute detailed scrutiny of a pathologic state.

I claim:

1. Apparatus for diagnosing the pathologic state of joints comprising at least two acoustical-to-electrical energy transducers, means for mounting said transducers adjacent the joint to be diagnosed and a reference joint respectively, means for selectively varying the pressure of application of said transducers to their respective joints, means connected to said transducers for making an aural record of the joint to be analyzed, means for making two simultaneous spaced parallel visual records of electrical signals, means including selective frequency filters connecting said transducers to said record making means, and means for analyzing the output of a portion of said aural record and making a visual record of the frequencies and their respective amplitudes.

2. Apparatus for diagnosing the pathologic state of joints comprising two acoustical-to-electrical energy transducers, means for fixing said transducers firmly against the joint to be examined and a reference joint respectively, electro-mechanical means for making two simultaneous spaced parallel visual records of electrical signals generated by said transducers, and means connecting said transducers to said electro-mechanical means.

3. The method of diagnosing the pathologic state of a joint comprising the steps of simultaneously exercising the joint to be examined and a reference joint, simultaneously transforming the acoustical signals generated by said joints into electrical signals, and making two simultaneous spaced parallel visual records of said electrical signals.

References Cited by the Examiner

UNITED STATES PATENTS

| | | | |
|---|---|---|---|
| 1,154,934 | 9/15 | Pilling | 128—2.05 X |
| 1,494,586 | 5/24 | Cary | 128—2 X |
| 2,119,649 | 6/38 | Roosen | 128—2 |
| 2,445,731 | 7/48 | Jaycox | 128—2 X |
| 2,637,316 | 5/53 | Grez | 128—2.1 |
| 2,648,328 | 8/53 | Hathaway | 128—2.05 |
| 2,678,692 | 5/54 | Ranseen | 128—2 X |
| 2,695,606 | 11/54 | Godaert | 128—2 |
| 2,712,309 | 7/55 | Offner | 128—2.1 |
| 2,712,975 | 7/55 | Golseth | 128—2.1 X |
| 2,744,521 | 5/56 | Schmid | 128—2 |
| 2,753,863 | 7/56 | Bailey | 128—2.05 |
| 2,821,188 | 1/58 | Pigeon | 128—2.05 |
| 2,827,040 | 3/58 | Gilford | 128—2.05 |
| 2,875,750 | 3/59 | Boucke | 128—2.05 |
| 2,899,653 | 8/59 | Capron | 128—2.1 X |
| 2,944,542 | 7/60 | Barnett | 128—2.07 X |

FOREIGN PATENTS 1,071,420 3/54 France.

RICHARD A. GAUDET, *Primary Examiner.*

ROBERT E. MORGAN, RICHARD J. HOFFMAN, LOUIS R. PRINCE, *Examiners.*